United States Patent
Bernstein et al.

(10) Patent No.: US 8,055,822 B2
(45) Date of Patent: Nov. 8, 2011

(54) MULTICORE PROCESSOR HAVING STORAGE FOR CORE-SPECIFIC OPERATIONAL DATA

(75) Inventors: Kerry Bernstein, Underhill, VT (US); Nazmul Habib, South Burlington, VT (US); Norman J. Rohrer, Underhill, VT (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 11/842,206

(22) Filed: Aug. 21, 2007

(65) Prior Publication Data

US 2009/0055826 A1 Feb. 26, 2009

(51) Int. Cl.
  *G06F 13/12* (2006.01)
  *G06F 19/00* (2006.01)
(52) U.S. Cl. .......................................... 710/65; 702/118
(58) Field of Classification Search ................ 710/65
  See application file for complete search history.

(56) References Cited

U.S. PATENT DOCUMENTS

| | | | | |
|---|---|---|---|---|
| 6,134,675 | A * | 10/2000 | Raina .............................. | 714/37 |
| 6,161,188 | A | 12/2000 | Gaskins et al. ................ | 713/501 |
| 6,728,892 | B1 | 4/2004 | Silvkoff et al. ................ | 713/320 |
| 6,804,632 | B2 | 10/2004 | Orenstien et al. | |
| 6,907,548 | B2 | 6/2005 | Abdo | |
| 7,032,119 | B2 * | 4/2006 | Fung .............................. | 713/320 |
| 7,197,652 | B2 | 3/2007 | Keller, Jr. et al. ............. | 713/320 |
| 2002/0018486 | A1 | 2/2002 | Musoll et al. ................ | 370/463 |
| 2003/0070013 | A1 | 4/2003 | Hansson .......................... | 710/59 |
| 2004/0006729 | A1 | 1/2004 | Pendurkar | |
| 2004/0158747 | A1 | 8/2004 | Kim .............................. | 713/300 |
| 2004/0215987 | A1 | 10/2004 | Farkas et al. .................. | 713/300 |
| 2005/0154931 | A1 | 7/2005 | Oh .............................. | 713/300 |
| 2006/0090161 | A1 * | 4/2006 | Bodas et al. .................. | 718/100 |
| 2006/0212677 | A1 | 9/2006 | Fossum .......................... | 712/1 |
| 2007/0220294 | A1 * | 9/2007 | Lippett .......................... | 713/320 |
| 2007/0220517 | A1 * | 9/2007 | Lippett .......................... | 718/102 |
| 2008/0082285 | A1 * | 4/2008 | Samaan et al. ................ | 702/118 |

FOREIGN PATENT DOCUMENTS

EP     1 555 595 A2     7/2005

OTHER PUBLICATIONS

Sailer, R. et al., "sHype: Secure Hypervisor Approach to Trusted Virtualized Systems", IBM Research Report, RC23511 (W0502-006) Feb. 2, 2005, Computer Science, 13 pgs.

* cited by examiner

*Primary Examiner* — Henry Tsai
*Assistant Examiner* — Titus Wong
(74) *Attorney, Agent, or Firm* — Harrington & Smith

(57) ABSTRACT

An integrated circuit includes a plurality of processor cores and a readable non-volatile memory that stores information expressive of at least one operating characteristic for each of the plurality of processor cores. Also disclosed is a method to operate a data processing system, where the method includes providing a multicore processor that contains a plurality of processor cores and a readable non-volatile memory that stores information, determined during a testing operation, that is indicative of at least a maximum operating frequency for each of the plurality of processor cores. The method further includes operating a scheduler coupled to an operating system and to the multicore processor, where the scheduler is operated to be responsive at least in part to information read from the memory to schedule the execution of threads to individual ones of the processor cores for a more optimal usage of energy.

18 Claims, 3 Drawing Sheets

4A) Provide a multicore processor that contains a plurality of processor cores and a readable non-volatile memory that stores information, determined during a testing operation, that is indicative of at least a maximum operation frequency for each of the plurality of processor cores

4B) Operating supervisor (scheduler) coupled to an operating system and to the multicore processor, where the scheduler is operated to be responsive at least in part to information read from the memory to schedule the execution of threads to individual ones of the processor cores

FIG. 4

MULTICORE PROCESSOR HAVING STORAGE FOR CORE-SPECIFIC OPERATIONAL DATA

TECHNICAL FIELD

The exemplary embodiments of this invention relate generally to data processors and systems and, more specifically, relate to multicore data processors and related systems, including schedulers.

BACKGROUND

For the purposes of this description a multicore microprocessor or processor may be considered to include a single integrated circuit or circuit module having a plurality (at least two) data processors that may be capable of independent operation. Each data processor can be referred to as a "core", and the integrated circuit or circuit module may thus be referred to as the multicore microprocessor or processor.

In a multicore microprocessor integrated circuit (chip), an across-chip delay variation can result in each of the cores exhibiting a different maximum operational frequency (which may be referred to as "$F_{max}$"). Recently, multicore microprocessors have been developed such that each of the cores can be run asynchronously and independently, each retiring a separate stream of threads or program instructions. In those cases where the threads are dependent, e.g., where the execution of one thread is dependent on the execution of another thread, a certain transaction may not be retired until some selected thread or threads are first completed, so that their results may be provided to other threads. Such "primary" threads thus gate the overall system performance and, as a result, should be executed as fast as possible. A problem that arises is that a system instruction dispatcher operates under the assumption that all cores are equally fast (i.e., $F_{max}$ for each core are equal), where in fact this is not the case. As a result, scheduling inefficiencies arise that impact the overall performance of the multicore processor system.

Another problem relates to multicore processor power consumption control. For achieving the lowest possible power consumption in a multicore microprocessor, where one or more cores may be placed in a sleep/doze/nap (lower power) mode, it is most desirable to have the fastest of the cores awake and retiring instructions while the slowest cores are off and saving energy. The problem is that presently there is no way of knowing which cores should be awake and operational, and which should be in a low power consumption mode, when they are not all being used at the same time.

In U.S. Pat. No. 6,161,188 Gaskins et al. describe a microprocessor having selective control features to determine its core-to-bus clock ratio. The microprocessor includes a fuse and buffer/control logic. The fuse can be programmed during fabrication. When blown, the fuse provides a permanent state that prescribes a fixed core-to-bus clock ratio. The buffer/control logic is coupled to the fuse. The buffer/control logic accepts the permanent state of the fuse and directs the microprocessor to set the core-to-bus clock ratio to a fixed value, thus disabling control of the core-to-bus clock ratio via external clock ratio control signals.

In U.S. Pat. No. 6,728,892 Silvkoff et al. describe a method for conserving power in a control area network (CAN) microcontroller that includes a processor core and a CAN/CAL (CAN application layers) module that includes a plurality of sub-blocks that cooperatively function to process incoming CAL/CAN messages. The method includes the steps of placing the processor core in a power-reduction mode of operation (e.g., a sleep or idle mode of operation), placing the CAN/CAL module in a power-reduction mode of operation, and activating the CAN/CAL module to process an incoming CAL/CAN message thereby terminating the power-reduction mode of operation thereof, while the processor core is in its power-reduction mode of operation.

In US Patent Application Publication 2003/0070013 Hansson discloses a method and apparatus for reducing power consumption within a pipelined processor. In one embodiment the method comprises defining an instruction which invokes a "sleep mode" within the processor and pipeline; inserting the instruction into the pipeline; decoding and executing the instruction, stalling the pipeline in response to the sleep mode instruction; disabling memory in response to the sleep mode instruction; and awaking the core from sleep mode based on the occurrence of a predetermined event. Methods for structuring core pipeline logic and extension instructions to reduce core power consumption under various conditions are also described, as are methods and apparatus for synthesizing logic implementing the aforementioned methodology.

In US Patent Application Publication 2004/0215987, Farkas et al. describe a computer system for conserving operating power which includes a number of computer hardware processor cores that differ amongst themselves in at least in their respective operating power requirements and processing capabilities. A monitor gathers performance metric information from each of the computer hardware processor cores that are specific to a particular run of application software then executing. A workload transfer mechanism transfers the executing application software to a second computer hardware processor core in a search for reduced operating power. A transfer delay mechanism is connected to delay a subsequent transfer of the executing application software if the system operating power may be conserved by such delay.

In US Patent Application Publication 2005/0154931, Oh describes apparatus and methods for controlling power of a processor having a plurality of cores. The apparatus and methods are said to operate such that independent control is possible of individual or selected cores and power supply circuits corresponding to the cores based on, for example, an operation state of the processor or a power mode. Embodiments of an apparatus for controlling power of a processor having a plurality of cores can include a plurality of power supply units each capable of independently supplying a supply power to a plurality of cores provided in one processor, a unit for checking at least one among a use state, a use amount and a power mode of each core and for turning on/off each checked core, and a unit that contacts with the unit for checking for controlling the power supply units in response to an on/off operation of each core.

In US Patent Application Publication 2006/0212677 Fossum describes embodiments of a multicore processor having active and inactive execution cores. In one embodiment an apparatus includes a processor having a plurality of execution cores on a single integrated circuit, and a plurality of core identification registers. Each of the plurality of core identification registers corresponds to one of the execution cores to identify whether the execution core is active.

In US Patent Application Publication 2004/0158747 Kim discloses a processor that includes a processor core and at least one peripheral device. A selecting circuit is used for determining an operational state of the processor and for outputting a selection signal based on the evaluation. A high-speed control circuit controls high-speed operations of at least one of the processor core and the peripheral device in response to the selection signal, and a low-speed and low-power control circuit controls low-speed and low-power operations of at least one of the processor core and the peripheral device in response to the selection signal.

In US Patent Application Publication 2002/0018486 Musoll et al. describe a logic system in a data packet processor that is provided for selecting and releasing one of a plurality of contexts.

SUMMARY

The foregoing and other problems are overcome, and other advantages are realized, in accordance with the exemplary embodiments of this invention.

In one aspect thereof the exemplary embodiments of this invention provide a method that includes determining operating characteristics of each individual core within a plurality of processor cores disposed on a multicore processor; and storing in a readable non-volatile memory of the multicore processor information expressive of at least one of the determined operating characteristics for each of the plurality of processor cores.

In another aspect thereof the exemplary embodiments of this invention provide an integrated circuit that comprises a plurality of processor cores and a readable non-volatile memory that stores information expressive of at least one operating characteristic for each of the plurality of processor cores.

In another aspect thereof the exemplary embodiments of this invention provide a data processing system that includes a multicore processor comprised of a plurality of processor cores and a readable non-volatile memory that stores information, determined during a testing operation, which is indicative of at least a maximum operating frequency for each of the plurality of processor cores. The system further includes a scheduler coupled to an operating system and to the multicore processor, where the scheduler is responsive at least in part to the information read from the memory to schedule the execution of threads to individual ones of the processor cores.

In yet another aspect thereof the exemplary embodiments of this invention provide a method to operate a data processing system, where the method includes providing a multicore processor comprised of a plurality of processor cores and a readable non-volatile memory that stores information, determined during a testing operation, that is indicative of at least a maximum operating frequency for each of the plurality of processor cores; and operating a scheduler coupled to an operating system and to the multicore processor, where the scheduler is operated to be responsive at least in part to information read from the memory to schedule the execution of threads to individual ones of the processor cores.

BRIEF DESCRIPTION OF THE DRAWINGS

The foregoing and other aspects of the embodiments of this invention are made more evident in the following Detailed Description, when read in conjunction with the attached Drawing Figures, wherein:

FIG. 4 is a logic flow diagram that is illustrative of a method in accordance with the exemplary embodiments of this invention.

DETAILED DESCRIPTION

Figure 1:
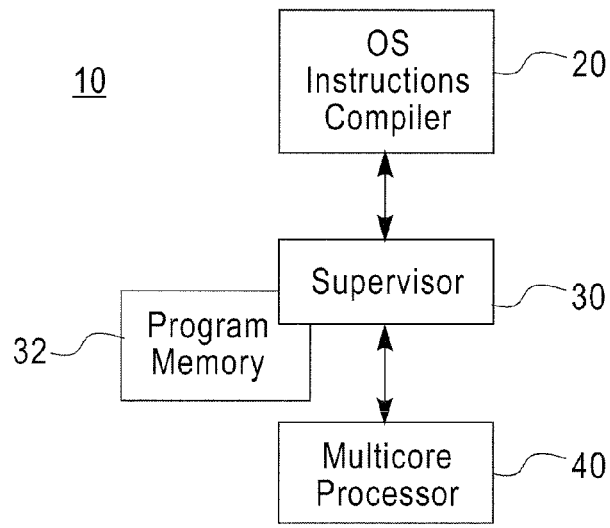
FIG. 1 is a block diagram of a data processing system that includes a multicore processor that is constructed in accordance with the exemplary embodiments of this invention, as well as a supervisor (scheduler) that operates in accordance with the exemplary embodiments of this invention.

FIG. 1 is a block diagram of a data processing system that 10 includes a multicore processor 40 that is constructed in accordance with the exemplary embodiments of this invention, as well as a supervisor (scheduler) 30 that operates in accordance with the exemplary embodiments of this invention. The supervisor 30 is interposed between an operating system (OS) 20 having instructions and a suitable compiler. The specifics of the OS 20 are not germane to an understanding of this invention. The supervisor 30 is assumed to include a program memory 32 that stores program instructions for directing the operation of the supervisor in accordance with the exemplary embodiments of this invention, as discussed in further detail below.

The supervisor 30 may be implemented in a hypervisor embodiment, where a hypervisor may be considered as a virtualization layer designed to isolate the OS 20 by running it in a hermetic run-time environment. The hypervisor concept is well-known in the art. One exemplary publication, incorporated by reference herein, that describes the hypervisor concept is IBM Research Report RC23511 (W0502-006), Feb. 2, 2005, "SHype: Secure Hypervisor Approach to Trusted Virtualized Systems", Reiner Sailer, Enriquillo Valdez, Trent Jaeger, Ronald Perez, Leendert van Doorn, John Griffin and Stefan Berger.

Also of potential interest, and incorporated by reference herein, is commonly owned U.S. Pat. No. 7,197,652, Method and System for Energy Management in a Simultaneous Multi-Threaded (SMT) Processing System Including Per-Thread Device Usage Monitoring", by Thomas Walter Keller, Jr. and Eric Van Hensbergen. These inventors describe a system wherein when a context switch occurs, the states of certain counters are read and stored by the operating system (generally by a low-level operating system or hypervisor above which multiple operating system instances may be executing). In this manner the hypervisor software accumulates information about usage of devices for each active thread in the system, which is generally a number of threads much larger than the number of simultaneously executing threads. At a context switch, the hypervisor software determines which threads will be run in the next execution slice, and can retrieve current usage information for each device for the next set of threads. The usage information is used for two purposes: 1) to restore the states of the usage counters so as to provide quasi-continuous measurement of device usage by the next set of threads, and 2) to provide input to the power management control scheme for predicting usage levels of the controlled devices for the next set of threads. The hypervisor software sets power management states or thresholds for the controlled devices via a power-management aware device controller that couples the controlled devices to the processing system.

Figure 2:
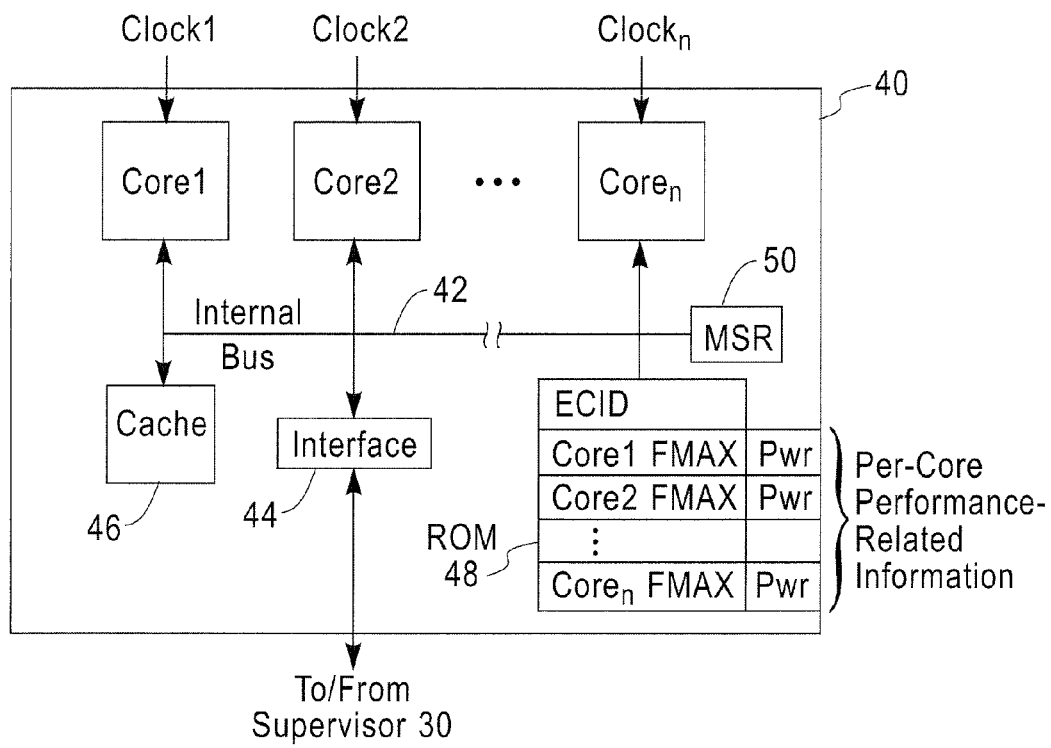
FIG. 2 is a block diagram of the multicore processor shown in FIG. 1.

FIG. 2 is a block diagram of the multicore processor 40 shown in FIG. 1. The multicore processor 40 includes a plurality of processor cores, shown for convenience as Core_1, Core_2, . . . , Core$_n$, where in general n is an integer that is greater than or equal to two. The multicore processor 40 may be embodied preferably as a single integrated circuit chip, although a module implementation containing a plurality of processor core dies and other components may also be employed. An internal bus 42 interconnects the processor cores Core_1, Core_2, . . . , Core$_n$ with interface circuitry 44 and with memory, shown for convenience and not by way of a limitation as a cache memory 46. In practice, each of the cores Core_1, Core_2, . . . , Core$_n$ may have an associated cache memory.

In accordance with the exemplary embodiments of this invention the multicore processor 40 includes a read only, non-volatile memory (ROM) 48 that stores, for each processor core Core_1, Core_2, . . . , Core$_n$, performance-related (operating characteristics) information for use by the supervisor 30 for scheduling thread/task executions on the cores. The performance-related information comprises at least an indication of F$_{max}$ determined for each of the cores during initial testing and characterization of the multicore processor chip 40. The core performance information can be binned and validated at different operating voltages and temperatures. In a non-limiting embodiment the ROM 48 is implemented using a set of electrical fuses integrated on-chip which are selectively blown electrically during chip or module test after each of the processor cores Core_1, Core_2, . . . , Core$_n$ is tested and its operation is characterized. The fuses encode the F$_{max}$ of each of the cores as determined by a validated chip test. The fuses may be blown at the same time that an electronic chip identification (ECID) is written onto the chip. The information encoded by the fuses may then be interrogated at initial program load (IPL) time and used by the supervisor 30 (e.g., hypervisor) firmware (embodied in program memory 32) for scheduling purposes. In this manner the supervisor 30 becomes aware of the relative performance of each of the cores Core_1, Core_2, . . . , Core$_n$, and the supervisor 30 may then determine which core to issue instructions to at which time. This determination can be made based on, as non-limiting examples, dynamic instruction reordering, standing pipeline queue depths, known contents of a given core's cache memory 46 and/or the urgency of the core's output, in addition to the information read from the ROM 48. In practice, the complier portion of the OS 20 can identify primary threads, and the supervisor 30 issues corresponding instructions to the performance-appropriate cores. A result is that a lowest energy, highest performance transaction can be retired.

As was noted above, the supervisor (hypervisor) firmware (embodied in program memory 32) is the software layer that exists between the OS 20 (and compiler and application software), which are platform independent, and the command interpreter which is core and machine-specific.

Thus, this embodiment of the invention provides for a non-volatile memory device, e.g., a set of fuse banks, to be added to the multicore microprocessor chip 40, with one bank dedicated to each of the microprocessor cores Core_1, Core_2, . . . , Core$_n$. At chip test/characterization time the maximum passing clock frequency (F$_{max}$) for each core is determined and written into the bank of fuses associated with that core. At IPL time, this information may be loaded into a machine state register (MSR) 50 in the nest logic of the multicore processor chip 40. The MSRs 50 can then be interrogated by the supervisor 30 firmware that identifies system resources to the OS 20. As instructions are issued they are targeted to a particular one of the cores Core_1, Core_2, . . . , Core$_n$, based on the throughput requirements of the transaction as interpreted by the supervisor (hypervisor) 30, and in accordance with the performance characteristics of the various available processor cores. In this manner the supervisor 30 may schedule a high priority thread to a core that has an associated high value of F$_{max}$, while scheduling a lower priority thread (e.g., one whose result will not be required immediately) to a core that has an associated lower value of F$_{max}$.

It may be assumed for the purposes of fully exploiting this invention that each of the cores Core_1, Core_2, . . . , Core$_n$ is provided with a separate clock frequency that is substantially matched to the maximum passing frequency F$_{max}$ for that core, that is, is substantially matched to the highest clock frequency that the core is capable of reliably operating with.

The exemplary embodiments of this invention are also based at least in part by a realization that in a normal processor, active power is much larger than standby power, and the fastest processor cores will complete a transaction in the least amount of time. However, in a system where much of the resource may be idle, the static power consumption may come to dominate total power consumption. It follows, then, that the slowest microprocessor cores which exhibit the lowest leakage power should be idled (e.g., clock-gated), while those cores with the highest performance (and leakage) should be running. At product test time, performance and leakage power (PWR) per core may be recorded in the bank of fuses (in the ROM 48) dedicated to each of the cores. At system boot or IPL, the fuses are interrogated and their state loaded into the MSRs 50. When the system resource manager (supervisor 30) needs to dispatch instructions to the individual cores, and idle down other cores, this information can then be used to make the resource allocation decisions. The power/performance registers embodied in the MSRs 50 are made available to the system management software for this decision. Based on system and application requirements, the scheduling algorithm determines which core(s) to turn off. Note that in those embodiments where power is completely cut off from idled processor cores (power gating), rather than where the clock is cut-off (clock gating), it may be more efficient for the system resource manager to power down those cores with the highest leakage power rather than the lowest.

In general, the power may be measured on a suitable tester by measuring the current with an applied voltage at both wafer final test and module final test. Module final test has the most accurate value due to operation at a correct temperature. The units of leakage power are watts.

Figure 3:
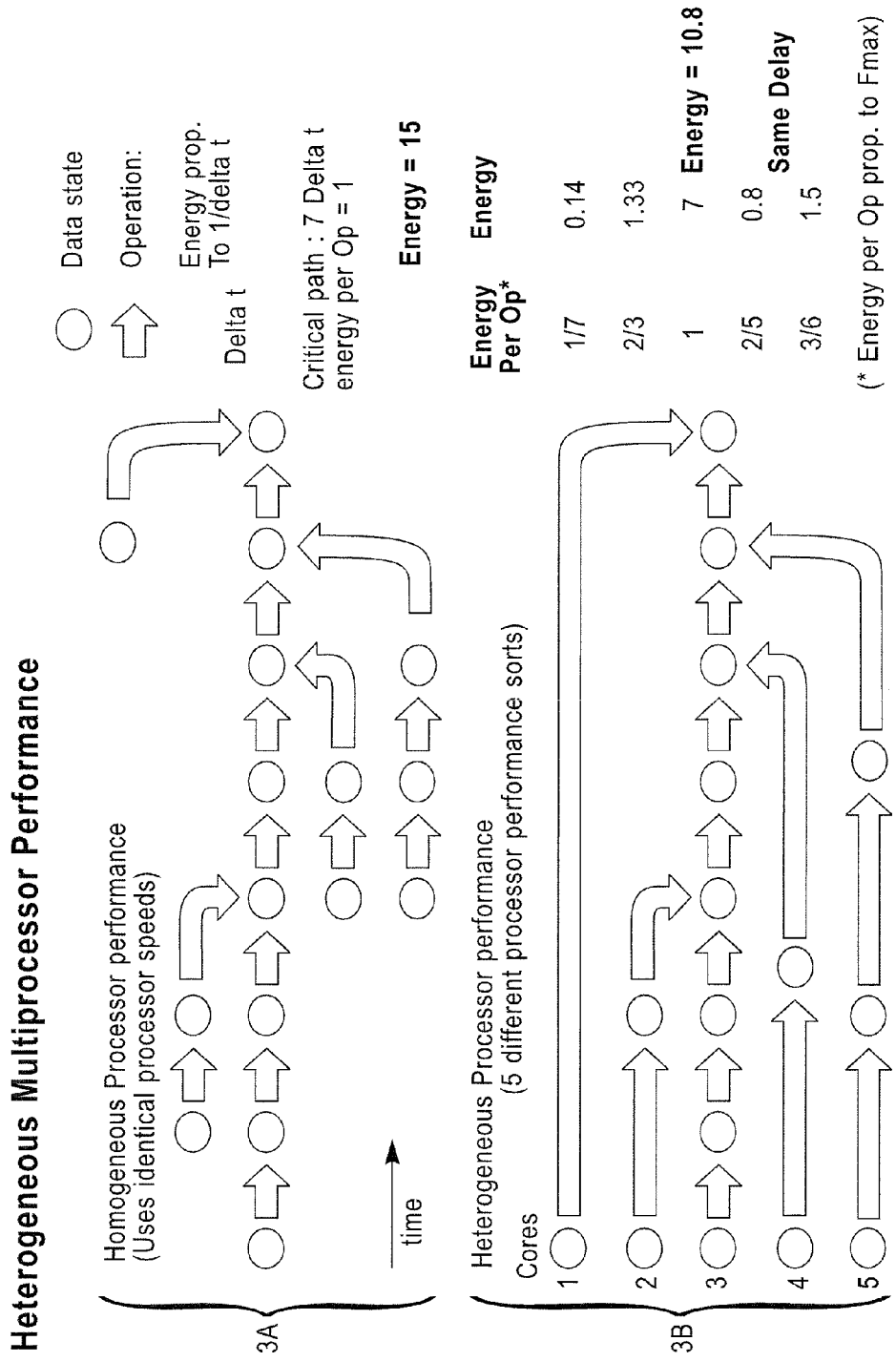
FIGS. 3A and 3B depict a non-limiting example of homogeneous multiprocessor performance and heterogeneous multiprocessor performance, respectfully.

FIGS. 3A and 3B depict a non-limiting example of homogeneous multiprocessor performance and heterogeneous multiprocessor performance, respectfully, and are useful in understanding the benefits obtained from the use of the exemplary embodiments of this invention. FIGS. 3A and 3B show various data states and operations and the total resultant energy consumed. FIG. 3A shows a case where the scheduler 30 assumes that each processor core operates with the same clock frequency and speed, while FIG. 3B shows a case of the assumption of different processor core performance metrics. The heterogeneous processor performance model of FIG. 3B, for executing the same data states and operations, results in the more optimum scheduling and a reduced energy consumption due to the scheduling of data on slower, lower power processors. In the example of FIG. 3B it can be seen that the various operations are scheduled at different times to take advantage of the lower power cores. In this example one may assume that core #3 should be the highest-available Fmax core, while core #1 should be the lowest performance core.

FIG. 4 illustrates a method to operate a data processing system, where the method includes (Block 4A) providing a multicore processor that contains a plurality of processor cores and a readable non-volatile memory that stores information, determined during a testing operation, that is indicative of at least a maximum operating frequency for each of the plurality of processor cores. The method further includes (Block 4B) operating a scheduler coupled to an operating system and to the multicore processor, where the scheduler is operated to be responsive at least in part to information read from the memory to schedule the execution of threads to individual ones of the processor cores.

In the method of FIG. 4, the information may be further indicative of leakage power for each of the plurality of processor cores.

In the method of FIG. 4, the scheduler may be further operated, in response at least in part to the information indicative of leakage power, for selectively placing one or more of the processor cores in a reduced power consumption mode of operation.

In the method of FIG. 4, the scheduler operation is directed by program instructions stored in a memory medium (program memory 32), and further responds to at least one of "dynamic instruction reordering" (a), "standing pipeline queue depths" (b), "known contents of a given processor core's cache memory" (c) and "the urgency of a given processor core's output" (d).

It can be appreciated that the exemplary embodiments of this invention may be implemented in other than the specific implementations described above. For example, the ROM 48 may be implemented using other than fuse technology, such as by using a non-volatile electrically-writable ROM technology. In some embodiments it may be desirable to provide a capability to rewrite the ROM contents, such as where the core performance data is re-characterized at some point to account for device aging or some other factor(s) that may affect the core electrical performance characteristics.

Further, the value of $F_{max}$ may be simply programmed into the ROM (e.g., as 5 GHz), or it may be expressed as some plus or minus offset from some predetermined nominal value (e.g., ±0.5 GHz). The same applies for the power leakage metric.

Note further that only the $F_{max}$ metric may be provided, or only the PWR metric may be provided, or both may be provided possibly in combination with one or more other metrics indicative of per-core performance that is usable by the supervisor 30 in scheduling thread/task execution in an optimum or near-optimum manner.

As such, various modifications and adaptations may become apparent to those skilled in the art in view of the foregoing description, when read in conjunction with the accompanying drawings and the appended claims. Further, some of the features of the examples of this invention may be used to advantage without the corresponding use of other features. As such, the foregoing description should be considered as merely illustrative of the principles, teachings, examples and exemplary embodiments of this invention, and not in limitation thereof.

What is claimed is:

1. A method, comprising:
storing in a readable non-volatile memory of a multicore processor integrated circuit device, that stores an identification of the multicore processor integrated circuit device, information expressive of at least one determined operating characteristic for each individual one of a plurality of processor cores that comprise the multicore processor integrated circuit device; and
during one of system boot or initial program load time, reading the information from the non-volatile memory and loading machine state registers of the multicore processor integrated circuit device with the information expressive of the at least one of the determined operating characteristics for each individual one of the plurality of processor cores, the machine state registers being connected with an interface of the multicore processor integrated circuit device for being interrogated by a supervisor program that identifies system resources for an operating system for scheduling program tasks to individual ones of the processor cores.

2. The method of claim 1, where the information is indicative of a maximum operating frequency for each of the plurality of processor cores.

3. The method of claim 1, where the information is indicative of leakage power for each of the plurality of processor cores.

4. An integrated circuit, comprising:
a plurality of processor cores;
an interface to circuitry external to the integrated circuit;
a readable non-volatile memory that stores information expressive of at least one operating characteristic of each individual one of the plurality of processor cores; and
machine state registers configured to be loaded during one of system boot and initial program load time with the information expressive of the at least one of the determined operating characteristics for each individual one of the plurality of processor cores, the machine state registers being connected with said interface for being interrogated by a supervisor program that identifies system resources for an operating system for scheduling program tasks to individual ones of the processor cores.

5. The integrated circuit of claim 4, where the information is indicative of a maximum operating frequency of each of the plurality of processor cores.

6. The integrated circuit of claim 4, where the information is indicative of leakage power of each of the plurality of processor cores.

7. The integrated circuit of claim 4, where the memory also stores electronic chip identification information.

8. The integrated circuit of claim 5, where each of said plurality of processor cores is provided, during operation, with a clock signal having a frequency that is less than the maximum operating frequency.

9. A data processing system, comprising:
a multicore processor integrated circuit comprised of a plurality of processor cores, a readable non-volatile memory that stores information, determined during a testing operation, that is indicative of at least a maximum operating frequency of each individual one of the plurality of processor cores, an interface to circuitry external to the multicore processor integrated circuit, and machine state registers configured to be loaded during one of system boot and initial program load time with the information indicative of at least a maximum operating frequency of each individual one of the plurality of processor cores, the machine state registers being connected with said interface and readable through said interface; and
a scheduler coupled to an operating system and to the multicore processor integrated circuit via said interface, said scheduler responsive at least in part to information read from the machine state registers via said interface to schedule the execution of threads to individual ones of the processor cores.

10. The data processing system of claim 9, where the information is further indicative of leakage power for each of the plurality of processor cores.

11. The data processing system of claim 10, where said scheduler is responsive at least in part to the information indicative of leakage power for selectively placing one or more of the processor cores in a reduced power consumption mode of operation.

12. The data processing system of claim 9, where said scheduler is further responsive at least in part to dynamic instruction reordering, standing pipeline queue depths, known contents of a given processor core's cache memory and an urgency of a given processor core's output.

13. The data processing system of claim 9, where each of said plurality of processor cores is provided, during operation, with a clock signal having a frequency that is less than the maximum operating frequency.

14. A method to operate a data processing system, comprising:
providing a multicore processor integrated circuit comprised of a plurality of processor cores and a readable non-volatile memory embodied as a bank of electrical fuses that store information, determined during a testing operation, that is indicative of at least a maximum operating frequency of each individual one of the plurality of processor cores, said multicore processor integrated circuit further comprised of an interface to circuitry external to the multicore processor integrated circuit, and machine state registers configured to be loaded from the bank of electrical fuses during one of system boot and initial program load time with the information indicative of at least a maximum operating frequency of each individual one of the plurality of processor cores, the machine state registers being connected with said interface and readable through said interface; and
operating a scheduler coupled to an operating system and to the multicore processor integrated circuit via said interface, said scheduler responsive at least in part to information read from the machine state registers via said interface to schedule the execution of threads to individual ones of the processor cores.

15. The method of claim 14, where the information is further indicative of leakage power for each of the plurality of processor cores.

16. The method of claim 15, further comprising operating said scheduler, in response at least in part to the information indicative of leakage power, for selectively placing one or more of the processor cores in a reduced power consumption mode of operation.

17. The method of claim 14, where said scheduler operation is directed by program instructions stored in a memory medium, and further responds to at least one of dynamic instruction reordering, standing pipeline queue depths, known contents of a given processor core's cache memory and an urgency of a given processor core's output.

18. The method of claim 14, where the information indicative of at least the maximum operating frequency of each individual one of the plurality of processor cores is programmed into said bank of electrical fuses during a same operation that stores an electronic chip identification (ECID) into said bank of electrical fuses.

* * * * *